United States Patent Office 2,796,757
Patented June 25, 1957

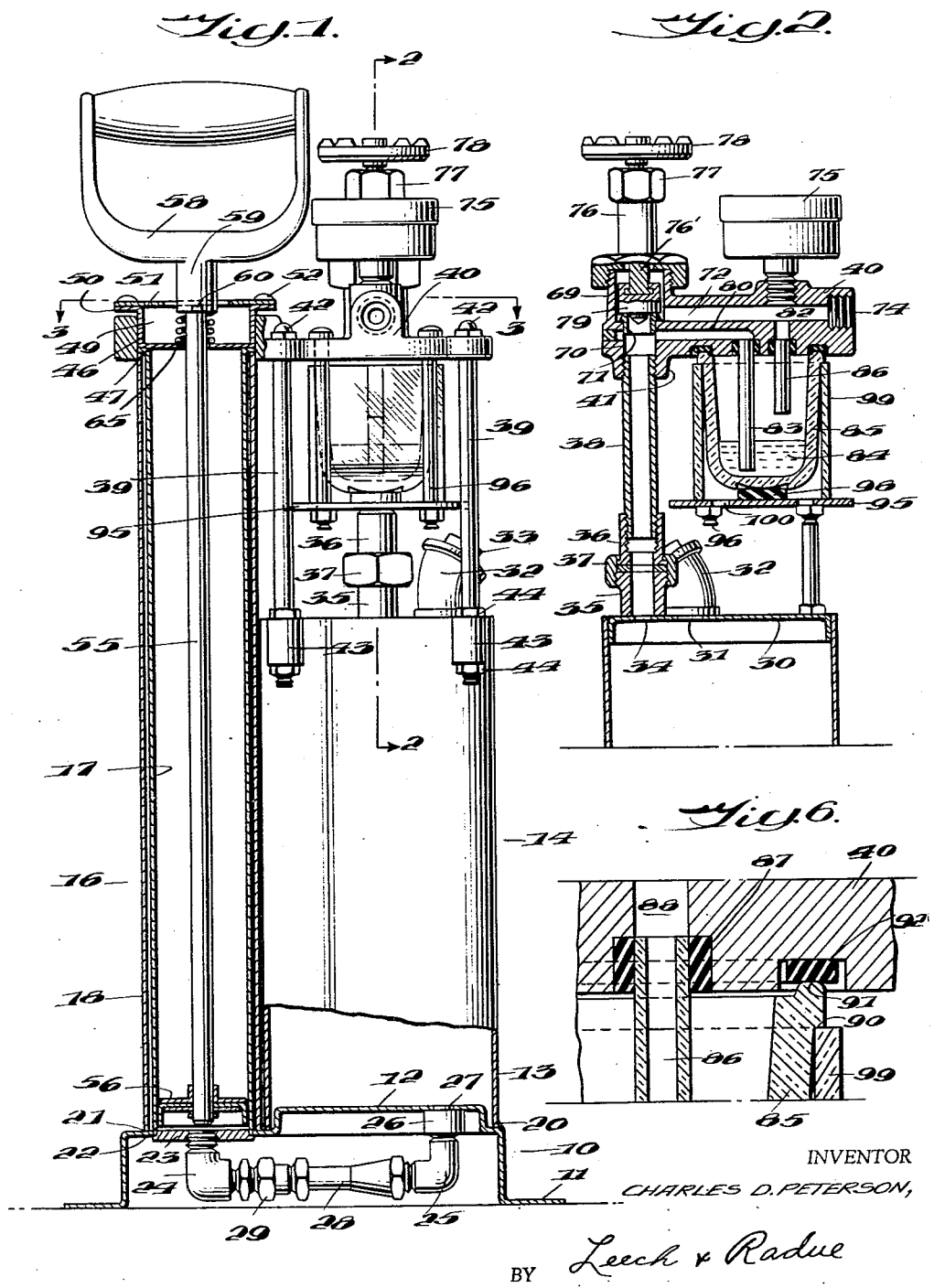

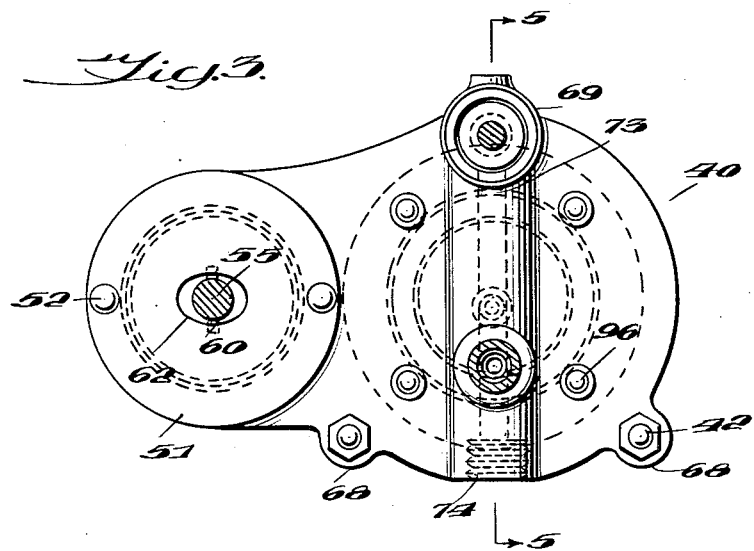
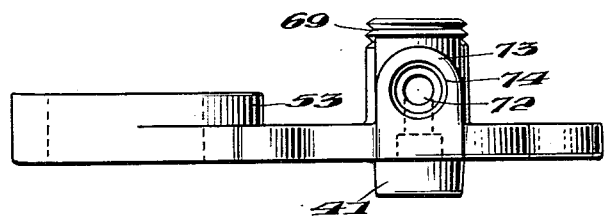
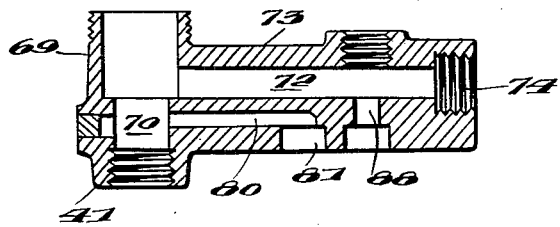

2,796,757

LEAK TESTING AND DETECTING APPARATUS FOR PIPING SYSTEMS

Charles D. Peterson, Dallas, Tex., assignor to Universal Controls Corporation, Dallas, Tex., a corporation of Texas Application August 23, 1954, Serial No. 451,603

4 Claims. (Cl. 73—40)

This invention relates to portable leak testing and detecting apparatus for piping systems and more particularly to apparatus for supplying pressure fluid to a piping system, gauging the pressure therein and giving a continuous visible indication of the presence or absence of a leak therein.

It is a general object of the present invention to provide novel and improved portable apparatus for leak testing and detecting in normally closed piping systems.

An important object of the invention consists in the provision of unitized apparatus for carrying out all of the necessary operations for a complete piping test.

Another important object of the invention resides in the combination of a minute quantity flow indicator with means for connecting it between the piping system to be tested and the source of fluid pressure together with means to by-pass the initial high rate flow of fluid required to build up initial testing pressure in the system.

Among the novel features of the invention may be enumerated the following:

Compact unit assembly of pump, reservoir tank, pressure gauge, bubbler indicator and by-pass valve;

The use of a single casting acting to assemble the various parts of the apparatus and to provide passages, ports and valve housing for and connecting the several parts;

Unique mounting of the tank and pump on a single base providing flanges for hold-downs;

Provision of a single capped entrance port for charging the tank with a leak detecting liquid and/or air from a power source instead of from the hand pump;

Use of the single, manifold-casting to support and protect the transparent bowl of the leak indicator;

Other and further objects and features of the invention will be more apparent to those skilled in the art upon a consideration of the accompanying drawings and the following specification wherein is disclosed a single, exemplary embodiment of the invention, with the understanding that such modifications may be made therein as fall within the scope of the appended claims without departing from the spirit of the invention.

In said drawings:

Fig. 1 is a side elevation, partly in vertical section of the portable leak testing apparatus;

Fig. 2 is a fragmentary vertical section taken on the plane of line 2—2 of Fig. 1;

Fig. 3 is a top plan view of the apparatus illustrating the single casting manifold and showing certain upper extensions therefrom in section;

Fig. 4 is a side elevation of the manifold;

Fig. 5 is a transverse vertical section through the casting manifold taken on the plane of line 5—5 of Fig. 3; and Fig. 6 is a fragment of Fig. 2 on an enlarged scale illustrating pressure sealing features.

In testing various piping systems, such as the service and distribution lines for or within a house, apartment, office building or the like; small main systems; and indeed most any fluid carrying piping system requiring insurance against leakage, the testing procedure has in the past been rather elementary. In most cases the system was sealed off except at one point, and there air was pumped in to a substantial pressure and a gauge or manometer of the mercury column type was connected and then the tester waited to see if a drop in pressure occurred. Such a drop would indicate leakage, but if the leak was small perhaps more than an hour of time was consumed in the determination, and after that some further procedure had to be executed for locating and correcting the leak. A more convenient and rapid method of testing has long been in demand, and in accordance with the present invention such a system and compact apparatus for carrying out its procedure with facility and expedition has been devised.

Briefly, in accordance with the present system, the operator connects a simple piece of apparatus by flexible hose to the piping network and pumps up the pressure in the system to an optimum value, say, 15 pounds per square inch, which is indicated on a gauge attached to the apparatus which contains a reservoir for a quantity of the compressed air. Allowing a few minutes for temperature equalization, he then closes a by-pass valve so that air from the reservoir, if required to supply the network as the result of a leak therein, must pass through a low volume flow indicator. This indicator functions as long as the leak continues and provides prompt and thorough indication of the presence and probable size of a leak. Moreover the apparatus may be used for detecting the location of one or more leaks by introducing a small quantity of a suitable vaporizable compound in the reservoir whereby its vapor enters the piping at the time of pressure build-up. The material may be an odorant for nasal testing, or a suitable halogen compound which operates to change the color of a flame in a leak testing lamp when vapors thereof come in contact with the flame.

For a more complete understanding of the invention, reference should now be had to the several figures of the drawing showing a specific embodiment of the apparatus for carrying out the improved testing method. This apparatus embodies efficiency, compactness and maximum usability and is built up about a circular sheet metal base 10 having more or less cylindrical side walls, a relatively wide base flange 11 and a top which is flat except for the off-center circular projection, about which the tubular wall 13 of the tank or reservoir 14 fits. This tank is substantially tangential to the side wall of the base but being of much less diameter leaves room for the mounting of the hand pump 16 close to it but within the diameter of the base.

This pump for supplying compressed air to the reservoir or tank 14 and to the piping system to be tested, comprises an inner tube or pump cylinder 17 formed of non-ferrous metal to resist corrosion and only of adequate thickness for the pressure to which it is exposed and the relatively minor thrust and wear of the pump plunger. It would be subject to damage from impact in the carrying or use of the device so it is loosely encased in a stronger steel guard tube 18.

Both the wall 13 of the reservoir and the guard 18 are abutted against the top wall of the base as shown at 20 and 21, the former being welded to insure fluid tightness and the latter merely obtaining its support from the base. The inner or working barrel 17 of the pump has a close fit through an opening 22 in the top of the base and extends just through it, the lower end of the barrel being closed by an air tight metal plug 23 of sufficiently heavy material to receive threads in the aperture in which the elbow 24 is screwed. A similar elbow 25 is received in the threaded aperture in sput 26 secured to the under side of the base projection 12 for connection with a hole 27 therein. Between elbows 24 and 25 is connected a metal tube 28 and a check valve 29 opening toward the reservoir. All of this is housed within the interior of the base whose broad lower flange may be held down with the feet while pumping.

The top of the tank has a suitably inserted fluid tight cover or head 30, as seen in Fig. 2, and this is perforated at 31 and has secured to its outer surface a 45° elbow 32 adapted to be closed by plug 33 for use in inserting liquid into the tank or for the connection, should it be found desirable, of an external mechanical source of air pressure. A second opening 34 in the head 30 of the reservoir is near one edge thereof as remote as possible from the axis through the tank and pump centers and welded to the outside of the head is the main part 35 of a union or coupling of conventional form including the swivel part 36 and the connecting nut 37. The swivel part receives a short rigid pipe nipple 38, as shown, which together with the two rigid posts 39 serves to securely position the combination casting-manifold 40 in a horizontal plane above the head of the tank and substantially at the level of the upper end of the pump barrel.

The threaded upper end of the nipple 38 is received in internal threads in the integral sput 41 on the lower side of the casting at one edge thereof and serves to provide both a passage for air between the reservoir and certain bores in the manifold, and also a strong mechanical connection between these two.

The rods 39 are threaded at their upper ends into suitable openings extending through the casting and combined cap and lock nuts 42 provide a substantial connection for these ends while the lower ends of the rods, also threaded, slip into open ended sleeves 43 welded at appropriate positions to the side walls of the tank adjacent the upper end. Adjusting and lock nuts 44 cooperating with the upper and lower ends of the sleeves 43 provide for a rigid assembly and permit adjusting the casting or manifold 40 to a desired level position at the correct height above the case so that the large straight-through bore 46 in the casting receives the barrel 17 and guard 18 of the pump just a short distance into the lower end thereof.

The bore 46 is a snug fit for the upper end of protective guard 18 of the pump and the inner barrel is flanged over at 47 to rest on the upper edge of guard 18. This inner barrel, the lower end of which is not secured in the close fitting opening in the base, is held down against reciprocation by the pump plunger by engagement with the inverted cap 49 having a close fit in the bore 46 and having a radial flange 50 overlaid by a disc 51 secured by screws 52 which also pass through the flange 50 into threaded apertures in the collar 53 which thickens the manifold casting to provide for receiving the upper end of the pump barrels and their cooperating parts as just described.

In the usual manner the present pump is fitted with a cylindrical rod 55 having the plunger 56 at the lower end equipped as will be understood with a piston cup leather or the like for insuring delivery of air on the down stroke and admission of air beneath the plunger on the up stroke.

The upper end of the pump rod is fitted with a spade handle 58, the hub 59 of which has oppositely directed integral lugs 60. The cap 49 has a bore providing a close working fit for the pump rod while the disc 51 has an elliptical opening 62, the long axis of which is sufficient to admit the lugs 60 while the short axis is only sufficient to pass the hub diameter. Thus with the handle properly oriented the lugs may be passed through the long axis of the elliptical opening and the handle rotated 90° to engage the lugs beneath the plate adjacent the short axis of the opening therein. This provides for carrying the whole assembly by the pump handle without withdrawing its rod and plunger. A helical spring 65 surrounding the pump rod above the cap 49 insures maintenance of the handle in its selected oriented position and may also act as a buffer spring at the end of pump plunger strokes.

The casting 40 is a part of many uses in the tester. It appears in detail in Figs. 3, 4 and 5 and in plan is seen to be the combination of a large circular area of commensurate diameter with the tank above which it is directly positioned, and a smaller circular area containing the bore 46 for the pump cylinders. The areas are merged by suitable curved lines to give a pleasing appearance. In Fig. 4 at 41 is shown the sput on the lower surface which is threaded to receive the supporting and connecting nipple 38 and projections 68 are seen in the plan view to accommodate the threaded openings for the support rods 39. This view also shows the relative spacing of these rods and the sput 41 to provide substantially uniform support about the perimeter of the larger circular area.

As viewed in Figs. 2 and 5 it will be seen that the casting is provided with an upwardly projecting integral sput 69 exteriorly threaded and counterbored in alignment with the opening into which the nipple 38 is threaded to provide a chamber 70. Above this lower threaded opening the walls of chamber 70 are straight and smooth and have pressed therein the valve seat thimble 71 having a relatively sharp upper edge and a flange seating at the bottom of the counterbore. The opening through the thimble communicates with the horizontal passage 72 extending transversely of the casting and accommodated in the upwardly projecting rib 73 thereon. The remote end of the passage is counterbored and internally threaded as at 74 for connection to a hose, pipe or the like which provides for attaching the test instrument to the system to be tested. Continuously connected to the passage 72 is the upwardly facing back-mounted pressure gauge 75 threaded into an opening intersecting bore 72.

The sput 69 receives a valve bonnet 76 over its external threads carrying the usual valve stem 76' and an operating screw as well as valve stem packing compressed by the nut 77 in the usual manner. The stem is provided with an operating handle 78 and at its lower end has swiveled thereto the valve head 79 adapted to cooperate with the sharp upper edge on the seat of thimble 71 to close the passage in 38 from communication with the passage 72.

Below and parallel to the manifold transverse passage 72 is a smaller and shorter passage 80 which enters the chamber 70 below the thimble forming the valve seat. It has a downturned opposite end which is counterbored to receive the flexible packing or rubber sleeve 82 which positions the glass tube 83 to depend below the surface of a liquid 84 in the glass bowl 85. A second and shorter tube 86 is received in a resilient packing 87 in a counterbore in passage 88 which extends up into passage 72 in alignment with the bore for the gauge for convenience in manufacture.

The glass bowl has its upper edge provided with a radial flange 90 and an upwardly projecting rib 91, the latter bearing on a resilient packing 92 seated in an annular channel in the under face of the casting 40 against which it is pressed with the aid of a metal plate 95 secured to the casting by a plurality of bolts 96, the headed ends of which pass through openings in the casting while the threaded lower ends pass through holes in the plate to receive suitable securing nuts, as shown. A resilient block 98 of rubber or the like is fitted between the bottom of the bowl and the plate to mount the bowl in a shock proof manner.

The bowl is formed of glass since this material is more resistant to etching by the halogen compounds which may be used in the tank for leak testing, and to the anti-freeze liquid in the bowl, and it is protected against breakage or against scattering of the parts from internal pressure breakage by an external sleeve 99 of transparent plastic material compressed between the flange 90 and the upper surface of the plate 95. In order to release the pressure should the bowl explode, the plate 95 is perforated as shown at 100.

In the normal and simplest use of the apparatus, the outlet port 74 is connected by a suitable hose structure to the piping system to be tested, the valve 79 is raised from its seat, the plug 33 is inserted in the elbow 32 and the air pressure is raised by a suitable number of strokes of the pump plunger up to some practical testing pressure, for instance, for a gas service line, about 15 pounds per square inch as shown on the gauge 75. This compressed air fills the reservoir and the passages in the manifold and other parts of the apparatus as well as the system of piping being tested. After a short wait to allow equalization of temperatures of the compressed air in the system the valve 79 is closed, disconnecting the tank from direct communication with the piping system but still leaving the pressure gauge 75 connected to the pipe. If there is any leakage in the piping system, air to replace that lost must come from the reservoir by way of nipple 38, passage 80, dip tube 83, short tube 86, passage 72 and outlet 74. In so doing it must bubble up through the liquid in the glass bowl, giving a clear indication not only of the presence of the leak but by the rapidity of bubbling an approximation of its size.

Should the leak be of a character difficult to locate, a system for finding the leak is available. The pressure is released and a quantity of a suitable volatile halogen compound, such as carbon tetrachloride or the like, poured into the tank or reservoir through its plug 33. The pumping up process is then repeated and, making use of a "halide" lamp of a type available on the market, a sniffer tube connected to this is passed along the various portions of the pipe and joints to detect the presence of any of the vaporized halide leaking out. The color of the flame from the halide lamp changes immediately in the presence of such a gas and thus the leak is pin-pointed promptly and with the least amount of effort. If this type of testing lamp is not available, some suitable odorant such as peppermint or the like may be placed in the reservoir and the pipe line sniffed over nasally for location of the leaks.

The purpose of the valve 79 is to permit pumping up the system without forcing any of the air through the bubbler, thereby avoiding any possibility of loss of the bubbling liquid and also to provide a larger passageway to increase the rate of pressure build-up.

It should be noted that the liquid 84 in the bubbler bowl should have anti-freeze characteristics if it is to be used in a cold climate. The quantity in the bowl and the length of the tubes 83 and 86 is such that no matter in what position the instrument may be set down no liquid can be lost through the tubes into other parts of the instrument.

The apparatus just described is not only extremely effective and efficient but is compact, light in weight, sturdy and easy to use by those lacking in skill and provides much more prompt results than methods heretofore used in the gas and other industries. Obviously the device is not limited for use in gas piping systems but may be used for testing any fluid or pneumatic system for leakage.

I claim:

1. Apparatus for testing pipe systems for leakage, in combination, a unitary construction of: a base having holddown flanges; a tank cylinder secured to and bottomed by said base; a piston pump on and above said base adjacent said tank; piping and a check valve in said base connecting the pump outlet to the tank; a discharge pipe extending upwardly from the top of the tank; a casting-manifold carried by and having a chamber communicating with said pipe; a direct passage in said manifold always open to said chamber; a passage from said chamber to an outlet port in said manifold; a valve incorporated in said chamber adapted to open or close communication between said passages; a transparent bowl partially filled with liquid having its edges in fluid tight engagement with the under side of said casting above said tank; a tube extending from the far end of said direct passage to beneath the liquid in said bowl; and means connecting the space in said bowl above the liquid to said second mentioned passage on the outlet port side of said valve.

2. The apparatus of claim 1 in which said pump has a tubular barrel extending into an opening in said casting and means auxiliary to said pipe to support the casting above and from said tank.

3. Apparatus for testing pipe systems for leakage, in combination, a cylindrical tank, a plunger pump having a cylinder substantially longer than the tank, a common base for said tank and cylinder, a casting-manifold secured to the top of said pump cylinder and extending over said tank, means supporting the casting-manifold from and above the top of said tank, a bubbler bowl supported from and below said casting-manifold and above said tank, means including a passage in said casting-manifold connecting said tank and bubbler, a valve having portions thereof integrated with said casting-manifold and having its inlet connected to said passage, one support between tank and casting-manifold being a pipe connecting said tank and passage, an outlet port in said casting-manifold, a passage from said valve outlet to said outlet port, and a connection from said bubbler to said last mentioned passage.

4. The apparatus of claim 3 in which said casting-manifold includes an integral valve chamber joining said outlet and bubbler passages to said pipe, valve means in said chamber for closing the connection between one of said passages and said pipe, means extending the unvalved passage including a vertical tube reaching to near the bottom of said bowl, and a second tube connecting the upper portion of said bowl to the other passage between the valve and outlet port.

References Cited in the file of this patent

UNITED STATES PATENTS

| Number | Name | Date |
|---|---|---|
| 302,577 | Mewes | July 29, 1884 |
| 982,520 | McKenzie et al. | Jan. 24, 1911 |
| 1,029,232 | Schaefer et al. | June 11, 1912 |
| 1,543,989 | Deck | June 30, 1925 |
| 1,732,035 | White | Oct. 15, 1929 |
| 1,959,863 | Griss | May 22, 1934 |
| 2,171,113 | Hopkins | Aug. 29, 1939 |
| 2,493,967 | Hendricks | Jan. 10, 1950 |
| 2,569,299 | Fegel | Sept. 25, 1951 |
| 2,668,437 | Patch | Feb. 9, 1954 |
| 2,703,979 | Shallenberg | Mar. 15, 1955 |